United States Patent
Chandler et al.

(10) Patent No.: US 7,904,407 B2
(45) Date of Patent: *Mar. 8, 2011

(54) HUMAN FACTORS PROCESS FAILURE MODES AND EFFECTS ANALYSIS (HF PFMEA) SOFTWARE TOOL

(75) Inventors: Faith T. Chandler, Fairfax Station, VA (US); William D. Valentino, Oviedo, FL (US); Monica F. Philippart, Orlando, FL (US); Kristine M. Relvini, Oviedo, FL (US); Colette I. Bessette, Chuluota, FL (US); Nathaneal P. Shedd, Titusville, FL (US)

(73) Assignee: The Boeing Company, Chicago, IL (US)

( * ) Notice: Subject to any disclaimer, the term of this patent is extended or adjusted under 35 U.S.C. 154(b) by 750 days.

This patent is subject to a terminal disclaimer.

(21) Appl. No.: 11/780,619

(22) Filed: Jul. 20, 2007

(65) Prior Publication Data

US 2008/0243928 A1 Oct. 2, 2008

Related U.S. Application Data

(62) Division of application No. 10/825,775, filed on Apr. 15, 2004, now Pat. No. 7,263,510.

(60) Provisional application No. 60/479,696, filed on Jun. 18, 2003.

(51) Int. Cl.
*G06F 15/18* (2006.01)
*G06F 19/00* (2006.01)
*G06N 5/02* (2006.01)
*G01N 37/00* (2006.01)

(52) U.S. Cl. ............. 706/47; 706/50; 700/108; 700/109; 702/81; 702/84

(58) Field of Classification Search ............... 706/45–48, 706/50, 52; 702/1, 81–84; 700/108–109
See application file for complete search history.

(56) References Cited

U.S. PATENT DOCUMENTS

| 5,197,114 | A | 3/1993 | Skeirik |
| 6,067,486 | A | 5/2000 | Aragones et al. |
| 6,526,337 | B2 | 2/2003 | Gardner |
| 6,678,642 | B1 | 1/2004 | Budge |

(Continued)

OTHER PUBLICATIONS

Sogg, "An Integrated Systems Approach to Human Factors in Commercial Aviation Maintenance Systems", 16th Human Factors in Aviation Mechanics Symposium, Apr. 2-4, 2002, pp. 1-8.*

(Continued)

*Primary Examiner* — Donald Sparks
*Assistant Examiner* — Banjamin Buss
(74) *Attorney, Agent, or Firm* — Caven & Aghevli LLC

(57) ABSTRACT

Methods, computer-readable media, and systems for automatically performing Human Factors Process Failure Modes and Effects Analysis for a process are provided. At least one task involved in a process is identified, where the task includes at least one human activity. The human activity is described using at least one verb. A human error potentially resulting from the human activity is automatically identified, the human error is related to the verb used in describing the task. A likelihood of occurrence, detection, and correction of the human error is identified. The severity of the effect of the human error is identified. The likelihood of occurrence, and the severity of the risk of potential harm is identified. The risk of potential harm is compared with a risk threshold to identify the appropriateness of corrective measures.

45 Claims, 11 Drawing Sheets

U.S. PATENT DOCUMENTS

| | | |
|---|---|---|
| 6,684,349 B2 | 1/2004 | Gullo et al. |
| 2003/0171897 A1* | 9/2003 | Bieda et al. .................. 702/185 |
| 2005/0021314 A1 | 1/2005 | Rose et al. |

OTHER PUBLICATIONS

Eiff, "At-Risk Safety Metric: A Proactive Safety Measurement Strategy", 14th Symposium on Human Factors in Aviation Maintenance, Mar. 28-30, 2000. pp. 1-15.*

Al-Shihabi et al., "A Framework for Modeling Human-like Driving Behaviors for Autonomous Vehicles in Driving Simulators", AGENTS'01, May 28-Jun. 1, 2001, pp. 286-291.

Bongard, "Maintenance Error Management through MEDA" 15th Annual Symposium on Human Factors in Maintenance and Inspection, Mar. 27-29, 2001, pp. 1-8.

Eliason, "Online Business Compter Applications", Second Edition, 1987, Science Research Associates, Inc., 23 pgs.

Johnson, "Human Factors Programs: Fact or Fantasy?", 15th Symposium on Human Factors in Aviation Mechanics, Mar. 27-29, 2001, p. 1-14.

Kanki, "Current Approaches to Assessing Risk in Maintenance and Inspection", 16th Human Factors in Avaiation Mechanics, Apr. 2-4, 2002, p. 1-7.

Luxjoj, "Risk Analysis of Human Performance in Aviation Maintenance", 16th Human Factors in Aviation Mechanics Symposium, Apr. 2-4, 2002, p.1-9.

Shrader-Frechette, "Technological Risk and Small Probabilities", Journal of Business Ethics 4, 1985, pp. 431-445.

* cited by examiner

HUMAN FACTORS PROCESS FAILURE MODES AND EFFECTS ANALYSIS (HF PFMEA) SOFTWARE TOOL

PRIORITY CLAIM

This application is a divisional of U.S. patent application 10/825,775, filed Apr. 15, 2004, which claims priority from United States Provisional Application entitled "HF PFMEA SOFTWARE," filed Jun. 18, 2003, assigned Ser. No. 60/479,696.

GOVERNMENT LICENSE RIGHTS

This invention was made with Government support under U.S. Government contract NAS10-11400 awarded by the National Aeronautics and Space Administration ("NASA"). The Government has certain rights in this invention.

FIELD OF THE INVENTION

This invention relates generally to process planning and, more specifically, to analyzing effects of human error on processes.

BACKGROUND OF THE INVENTION

Human error has measurable monetary and safety consequences. To take one example, between 1992 and 2002, the National Aeronautics and Space Administration ("NASA") experienced 10 major failures at an estimated cost of around $500,000,000 for which human error was the dominant contributor. This estimate includes only the financial cost of actual losses. This estimate does not include either non-financial losses, cost overruns or the cost of flight cancellations resulting from human error.

NASA is not unique in experiencing losses as a result of human error. Other portions of the public sector, including the military, other governmental entities, and the private sector experience substantial losses as a result of human error.

Generally, the most effective method to combat error is to identify where such errors may produce negative consequences and why such errors occur, and to try to eliminate the cause of the errors or mitigate their effects. Failure Mode and Effects Analysis (FMEA) was developed for the purpose of identifying potential hardware failures and "worst case" effects of these failures so that hardware failures could be eliminated or the negative consequences could be mitigated. Similarly, process Failure Modes and Effects Analysis (PFMEA) was developed to analyze each process in a system to identify possible procedural failures and "worst case" effects of each possible failure in order to eliminate or reduce the occurrence of such failures and/or to eliminate or mitigate the negative effects of the failures. To facilitate the identification and evaluation of human errors in PFMEAs, the Human Factors Process Failure Modes and Effects Analysis (HF PFMEA) was developed. HF PFMEA is a disciplined, systematic method to analyze each task in a process to identify potential human errors, the factors that contribute to the occurrence of the errors, the likelihood of the errors, the respective "worst case" effects of such errors, and the likelihood of the worst-case effects on a system. The methodology provides multiple aids that assist the analyst in identifying human errors for tasks (described by an action verb), factors that contribute to the likelihood that the error would occur, and a means to rank likelihood based on barriers and controls. In addition, the HF PFMEA identifies recommendations to avoid the occurrence of errors or to reduce any harm the errors may cause. HF PFMEA can be used at any phase in the system life cycle. In early concept design, the HF PFMEA facilitates design activities by identifying potential human errors, prior to system fabrication, so that designs may be modified to eliminate the errors or mitigate their effects. Later in the system life cycle, when the system is in operation, HF PFMEA improves project safety by providing a capability to analyze human factors issues including health and safety risks and generate recommendations for process improvement. HF PFMEA facilitates design of activities, systems and environments to enhance the abilities of personnel involved in a process and accommodate the limitations of personnel to produce safe, productive and comfortable use of a system.

Even though the potential benefits of HF PFMEA are tremendous, the method is not used as often as it could be because performing HF PFMEA involves a time-consuming and labor-intensive manual process by one or more persons trained in HF PFMEA. The HF PFMEA methodology includes functional analysis, task analysis, root cause analysis, work methods analysis, risk assessment, human error identification, human error analysis, and other techniques. Once the analysis is complete, it must be documented in the HF PFMEA table. An analyst builds HF PFMEA tables to present most of the analysis data resulting from the manual HF PFMEA process. Because extensive knowledge in human error analysis is required and a large volume of data must be incorporated into the HF PFMEA tables, creation of these tables is very time-consuming. As a result, existing HF PFMEA methodologies are expensive, time-consuming, and require extensive training. These issues unfortunately represent barriers preventing more widespread and more extensive use of HF PFMEA methodologies.

Thus, there is an unmet need in the art for facilitating HF PFMEA and thereby allowing for faster, less costly ways to implement plans to evaluate and control human error throughout the system life cycle in order to reduce risk and improve process efficiency.

SUMMARY OF THE INVENTION

The present invention provides a method, computer-readable medium, and system for facilitating Human Factors Process Failure Modes and Effects Analysis (HF PFMEA). Embodiments of the present invention guide a user through each step in the HF PFMEA process by requesting and guiding input in mission analysis, functional analysis, identification of human-system interfaces, task analysis, identification of potential human errors, identification of performance shaping factors, identification of barriers and controls, risk assessment, and generation of recommendations. The software supports task identification and definition by providing a list of action verbs from which the user can select, thereby providing a list of relevant, potential human errors for each action verb. The software also provides a list of performance shaping factors (factors that influence human performance) for each potential human error thereby facilitating the assessment of risks and aiding the user in the development of recommendations to reduce risk. As a result, HF PFMEA can be performed by personnel who are not specially trained in HF PFMEA and have moderate knowledge of human error analysis (rather than expert knowledge of human error analysis). Additionally, the software produces the HF PFMEA table and related reports. Advantageously, the analysis and table production can be performed more quickly and efficiently with a great reduction of time-consuming manual steps.

Generally, embodiments of the present invention provide methods, computer-readable media, and systems for automatically performing Human Factors Process Failure Modes and Effects Analysis for a process. Methods, computer-readable media, and systems for automatically performing Human Factors Process Failure Modes and Effects Analysis for a process are provided. At least one task involved in a process is identified, where the task includes at least one human activity. The human activity is described using at least one verb. A human error potentially resulting from the human activity is automatically identified, the human error potentially resulting from the human activity being related to the verb used in describing the task. Performance shaping factors that increase the likelihood of occurrence of the error are identified. Barriers that have the potential to prevent the error from occurring are identified. A likelihood of occurrence of the human error is identified. A likelihood of detection and correction of the human error is identified. Together, the likelihood of occurrence of the human error and the likelihood of detection and correction of the human error are used to calculate the probability of occurrence of the effect of the human error. The severity of the effect of the human error is identified. The probability of the occurrence of the effect of the error and the potential severity of the effect of the error are used to calculate the risk of potential harm resulting from the human error. The risk of potential harm is compared with a risk threshold to identify the need and appropriateness of correctives measures.

BRIEF DESCRIPTION OF THE DRAWINGS

The preferred and alternative embodiments of the present invention are described in detail below with reference to the following drawing.

DETAILED DESCRIPTION OF THE INVENTION

By way of overview, embodiments of the present invention provide methods and computer-readable media for automatically performing Human Factors Process Failure Modes and Effects Analysis as well as risk analysis for potential human errors that may occur in a process. Methods, computer-readable media, and systems for automatically performing Human Factors Process Failure Modes and Effects Analysis for a process are provided. At least one task involved in a process is identified, where the task includes at least one human activity. The human activity is described using at least one verb. A human error potentially resulting from the human activity is automatically identified, the human error potentially resulting from the human activity being related to the verb used in describing the task. Performance shaping factors that increase the likelihood of occurrence of the error are identified. Barriers that have the potential to prevent the error from occurring are identified. A likelihood of occurrence of the human error is identified. A likelihood of detection and correction of the human error is identified. Together, the likelihood of occurrence of the human error and the likelihood of detection and correction of the human error are used to calculate the probability of occurrence of the effect of the human error. The severity of the effect of the human error is identified. The probability of the occurrence of the effect of the error and the potential severity of the effect of the error are used to calculate the risk of potential harm resulting from the human error. The risk of potential harm is compared with a risk threshold to identify the need and appropriateness of correctives measures.

Figure 1:
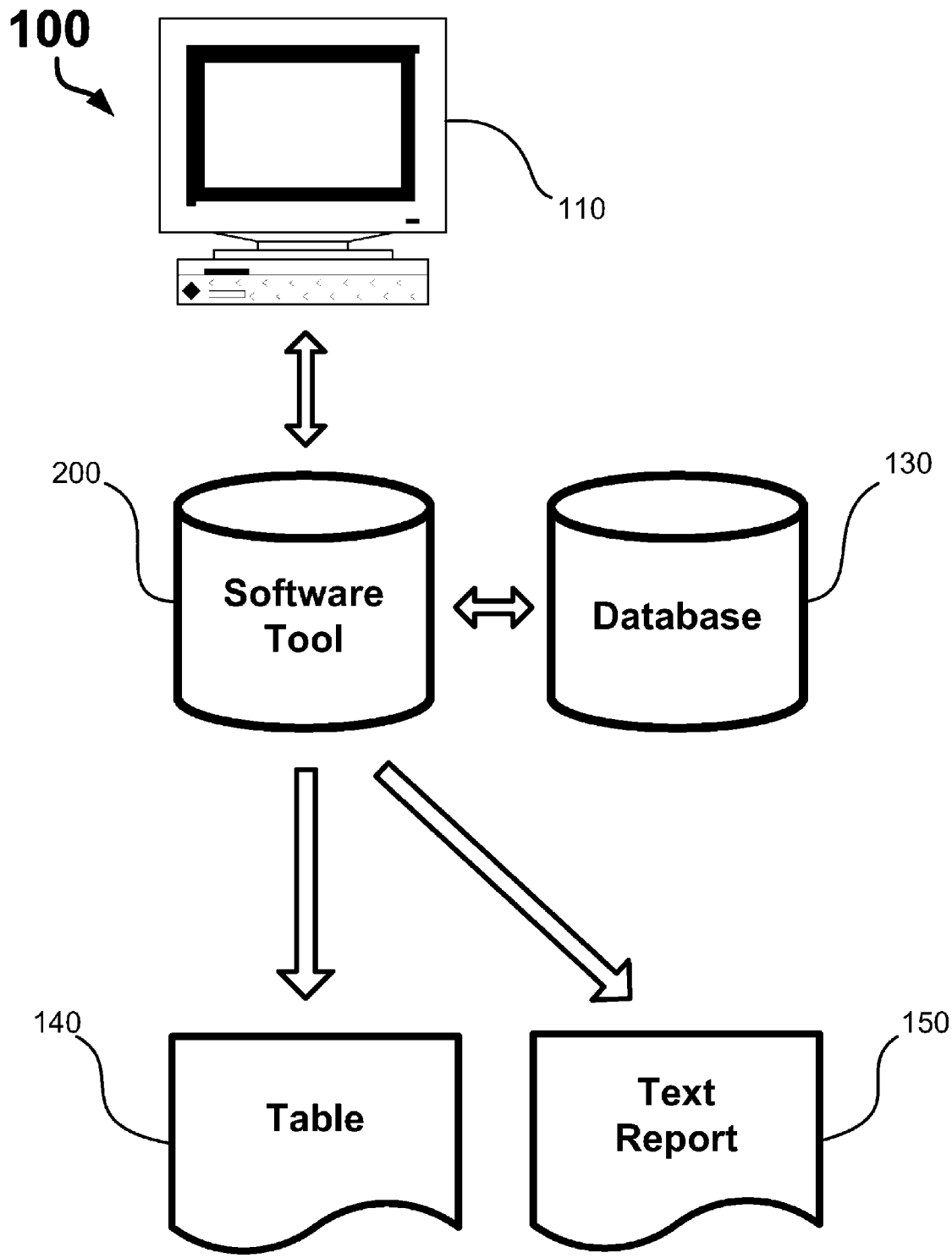
FIG. 1 is a block diagram of a system according to an embodiment of the present invention.

Referring now to FIG. 1, an exemplary system 100 according to a non-limiting embodiment of the present invention is provided for performing automated Human Factors Process Failure Modes and Effects Analysis (HF PFMEA). The system 100 includes one or more workstations 110 which guide a user through the HF PFMEA process. Although a single desktop workstation 110 is shown, multiple workstations 110 suitably are used to allow multiple users to interact with the system 100 to facilitate the HF PFMEA process. In addition to desktop workstations, other types of data processing devices are useable with embodiments of the present invention, including handheld, portable, or other types of workstations.

The workstation 110 interacts with a software tool 200 that includes instructions for guiding the user through the HF PFMEA process and human error risk assessment. As will be further described below, the software tool 200 interacts with the user through the workstation 110 both to elicit information from the user and to guide the user through the process. The software tool 200 creates and interacts with a database 130. The database 130 includes a collection of verbs that can represent tasks involved in a process, a collection of potential human errors for each action verb, and a collection of performance shaping factors for each potential error.

Interacting with the database 130, the software tool 200 is operable to generate at least two outputs: a completed HF PFMEA table 140 and a text report 150. The HF PFMEA table 140 includes aspects of the process warranting analysis, as will be further described below. The text report 150 details all the phases of analysis, from mission statement to recommendations, in an organized manner. FIG. 1 represents the HF PFMEA table 140 and text report 150 as documents, but the outputs 140 and 150 suitably are generated in a printed, electronic, or web-based document, or other form.

The system 100 can be implemented using any suitable software environment. In one presently preferred embodiment, the system 100 is created using any acceptable database tool such as Microsoft Access® or a similar database manager. The HF PFMEA table 140 generated is exportable to a word processing software tool such as Microsoft Word®, a spreadsheet software tool such as Microsoft Excel®, or another useful format such as hyper-text markup language (html) for presentation on the World Wide Web. The text report 150 suitably is generated by a word processing software tool such as Microsoft Word® or the like. The software code suitably is written in Java®, constructed with the J-Builder® program. The software code can be downloaded into a handheld device such as a Palm Pilot® or similar hand held device for human error analysis in the field.

Figure 2:
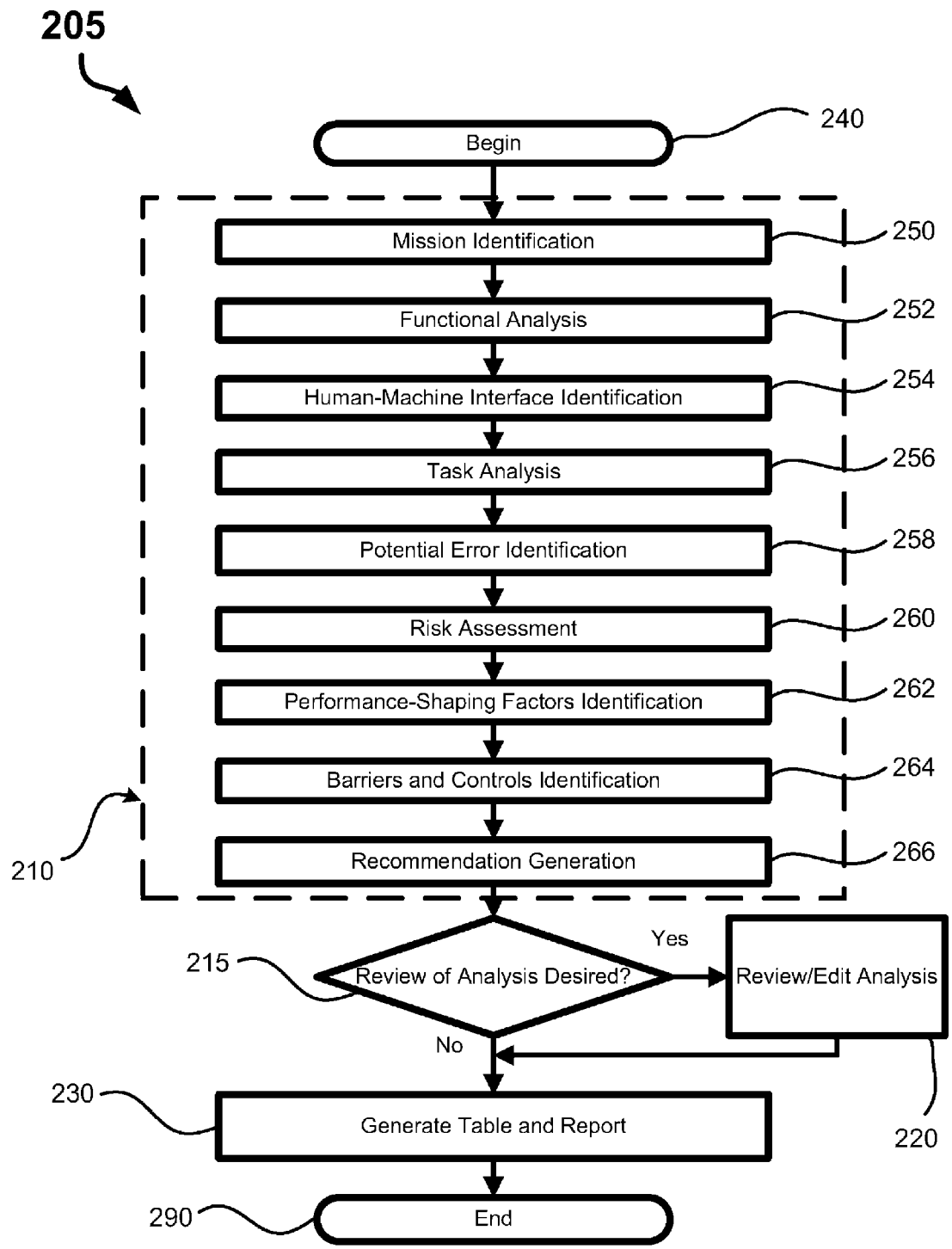
FIG. 2 is a flowchart of a routine according to an embodiment of the present invention.

Referring to FIG. 2, the software tool 200 (FIG. 1) according to an embodiment of the present invention performs an exemplary routine 205 with three main components: an analysis component 210, a task tree component 220, and a reporting component 230. The three components 210, 220, and 230 are interrelated. All data entered and selected by a user may be automatically saved, edited or printed at any time.

First, the analysis component 210 guides the user through a step-by-step HF PFMEA and human error risk assessment. In one presently preferred embodiment, the analysis component 210 includes fourteen blocks. By way of overview, the routine 205 encourages the performance of a preliminary or cursory screening risk assessment in a block 260 and the detailed risk assessment in the block 270 prior to continuing with the analysis, to quickly identify those items that do not require further consideration. Early encouragement of risk assessment thus saves time and resources by limiting the number of potential human errors that received a more time consuming detailed analysis and risk assessment. However, the preliminary risk assessment does provide a very conservative assessment of risk. When a more detailed and accurate assessment of risk is required, the detailed risk assessment suitably is used. Although there is a recommended order of the steps in the HF PFMEA, some steps may be performed in any sequence. The tool 200 (FIG. 1) can be configured to provide warnings when necessary data is not available to continue.

Each of the blocks of the analysis component 210 provides guidance in performing HF PFMEA and human error risk assessment. These instructions accommodate a range of users with different levels of expertise. Embodiments of the invention preferably use industry standard language and avoid HF or PFMEA jargon and acronyms. In one presently preferred embodiment, each block also provides on-screen help. Such on-screen help, presented in a smaller window, provides users with instruction on how to use the software features available for the specific screen, and provides guidance on how to proceed with the analysis. The help screen is particularly useful for novice users and may be collapsed if the user wishes.

The routine 205 includes steps comprising one presently preferred embodiment of the present invention. At a block 250, a mission identification is performed. The mission identification allows the user to begin a new analysis or open an existing analysis. If beginning a new analysis, the user names the analysis, describes the process to be analyzed, and enters a risk threshold value. The risk threshold is the value below which the risk is considered sufficiently low such that potential human errors presenting a risk at or below the risk threshold do not merit further analysis. The routine 205 prompts the user and accepts inputs to perform the mission identification at the block 250.

Figure 3:
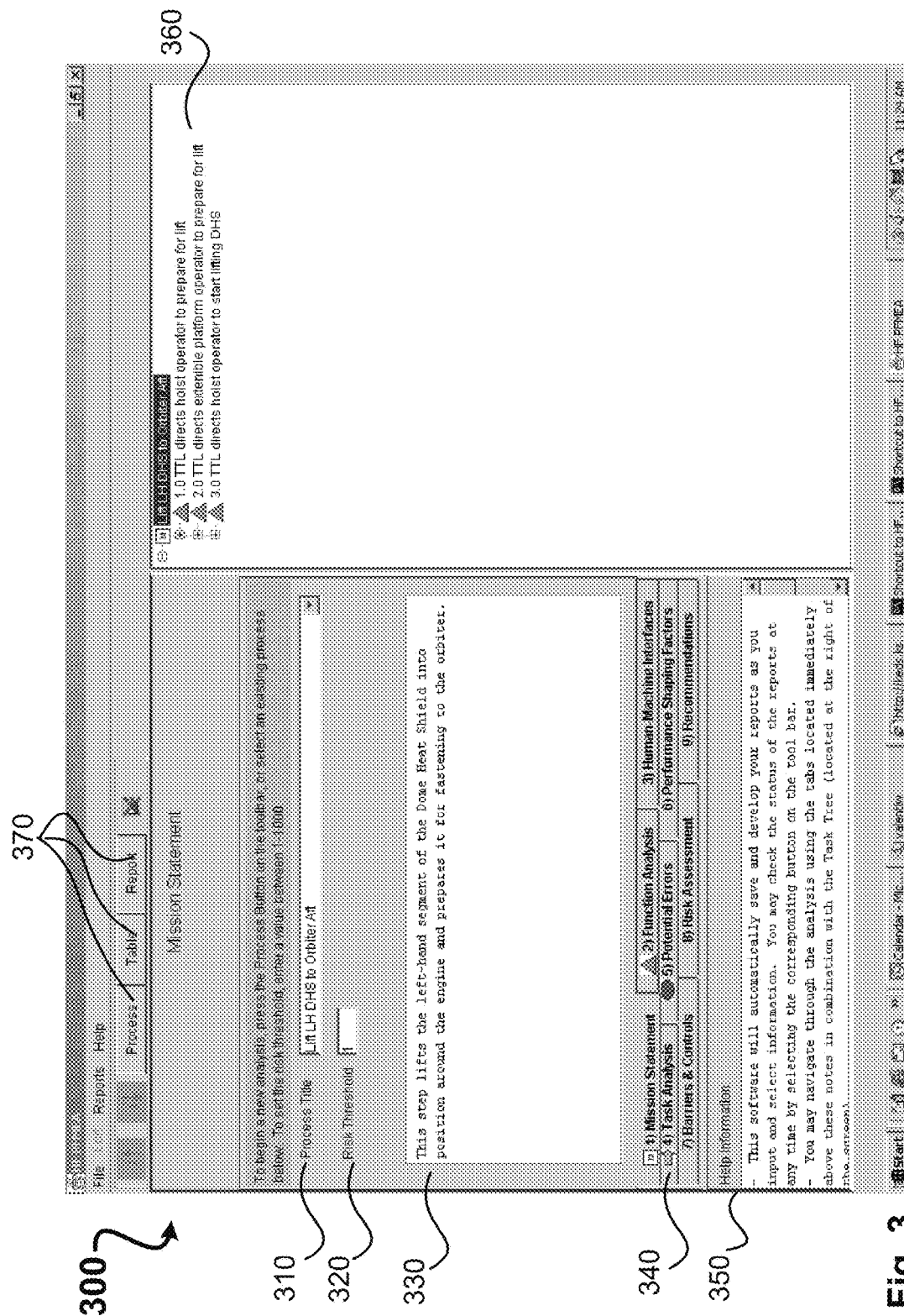
FIGS. 3-11 are screen shots of an exemplary implementation of the routine of FIG. 2.

FIG. 3 is an exemplary mission identification entry screen 300. The mission identification entry screen 300 provides a title entry field 310 for naming the process being analyzed. The mission identification entry screen 300 also provides a risk threshold field 320 for specifying the risk threshold beneath which potential human errors will be omitted from further analysis. In addition, the mission identification entry screen 300 provides a definition field 330 allowing the user to enter a description of the process.

In addition to the mission identification-specific aspects of the mission identification entry screen 300, the mission identification entry screen 300 also shows a number of features in one presently preferred embodiment of the software tool 200 used to facilitate performance of the HF PFMEA and human error risk assessment. Navigation buttons 340 allow the user to move between different steps in the analysis, such as between the mission identification entry screen 300 and other aspects of the entry to be described below. The navigation buttons 340 allow for flexibility in revising different aspects of the HF PFMEA throughout the analysis. Also, an on-screen help window 350 provides guidance to users not well-versed in HF PFMEA, human error risk assessment, or use of the HF PFMEA software tool 200. A hierarchy window 360 shows the functions and tasks included in the process, as will be explained further below. Also, as the navigation buttons 340 allow flexibility in moving between aspects of the analysis, software control buttons 370 allow the user to move between phases of the software tool, such as by allowing the user to move between the HF PFMEA process phases and the table 140 and report 150 (FIG. 1) which are generated by the process. Thus, as a user makes changes in the process, the user can monitor effects of the changes in the outputs of the process. Similarly, after the outputs have been generated, if the user should need to make changes in the process, the user can easily return to the process to effect those changes.

Referring back to FIG. 2, at a block 252 a functional analysis is performed. The functional analysis elicits from the user titles and statements describing the functions involved in completing the overall process. In a preferred embodiment, all functions involved in the process should be included in the functional analysis 252 to provide a foundation for a complete assessment of the process. The user may add or delete functions as necessary throughout the performance of the automated HF PFMEA. In one presently preferred embodiment, each of the functions is assigned a function identifier. For example, a first function may be identified as "1.0" or "A." The software tool 200 prompts the user and accepts inputs to perform the functional analysis at the block 252. It will be appreciated that the process can include a plurality of functions with one or more of the functions including one or more tasks.

Figure 4:
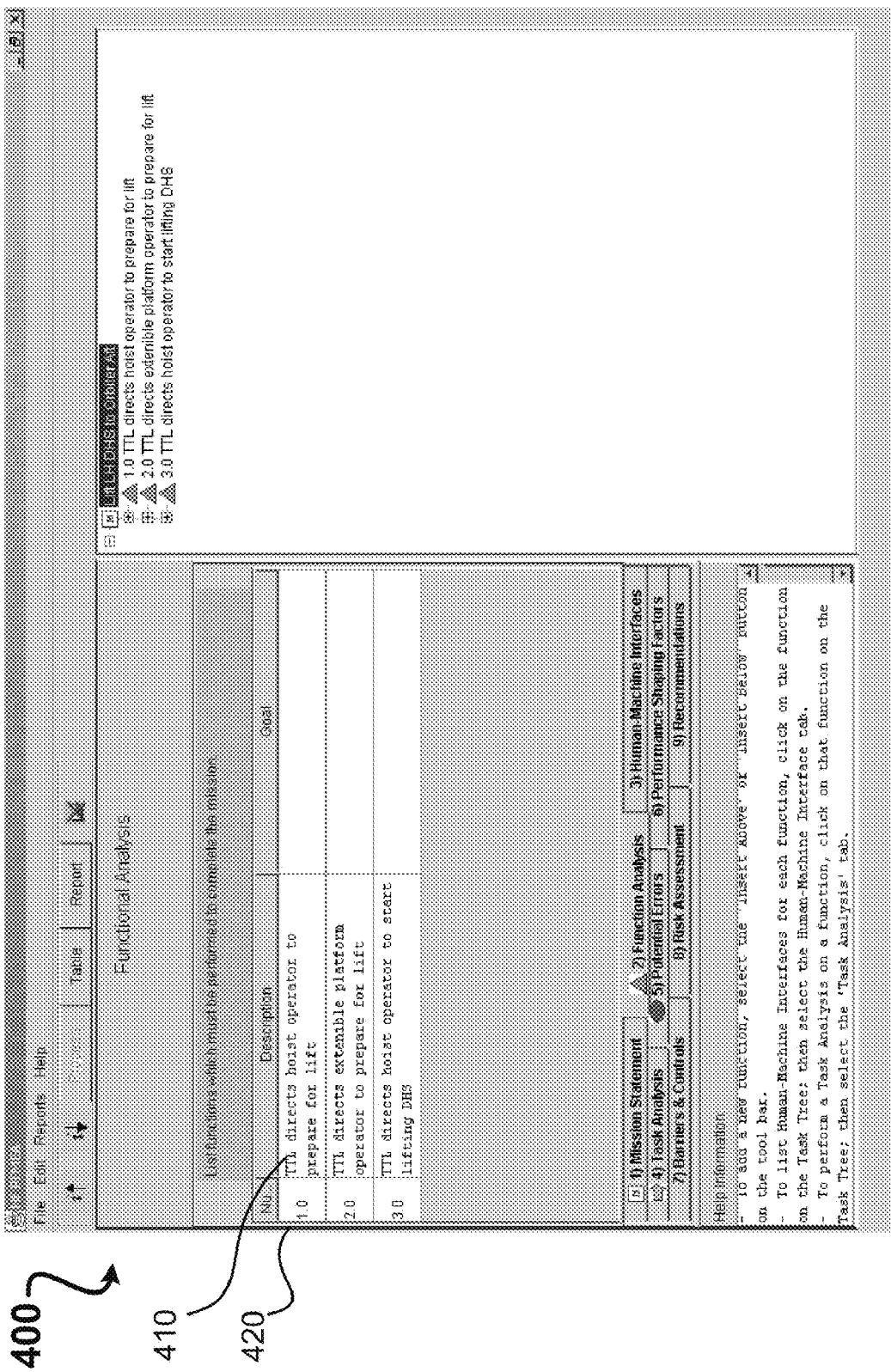

FIG. 4 is an exemplary functional analysis entry screen 400. The functional analysis entry screen 400 provides a function description column 410 in which the functions involved in the process are entered. The functional analysis entry screen 400 also provides a function identifier column 420 in which the functions entered can be numbered, lettered, or otherwise identified.

Referring back to FIG. 2, at a block 254, a human-system interface identification is performed. The human-system interface identification elicits from the user a list of the human-system interactions anticipated in the completion of the process. Such an identification is useful because it provides a systematic means of identifying all possible interfaces in the process, so that the analysis preferably includes most if not all potential errors associated with the interfaces. The software tool 200 prompts the user and accepts inputs to perform the human-system interface identification at the block 254.

Figure 5:
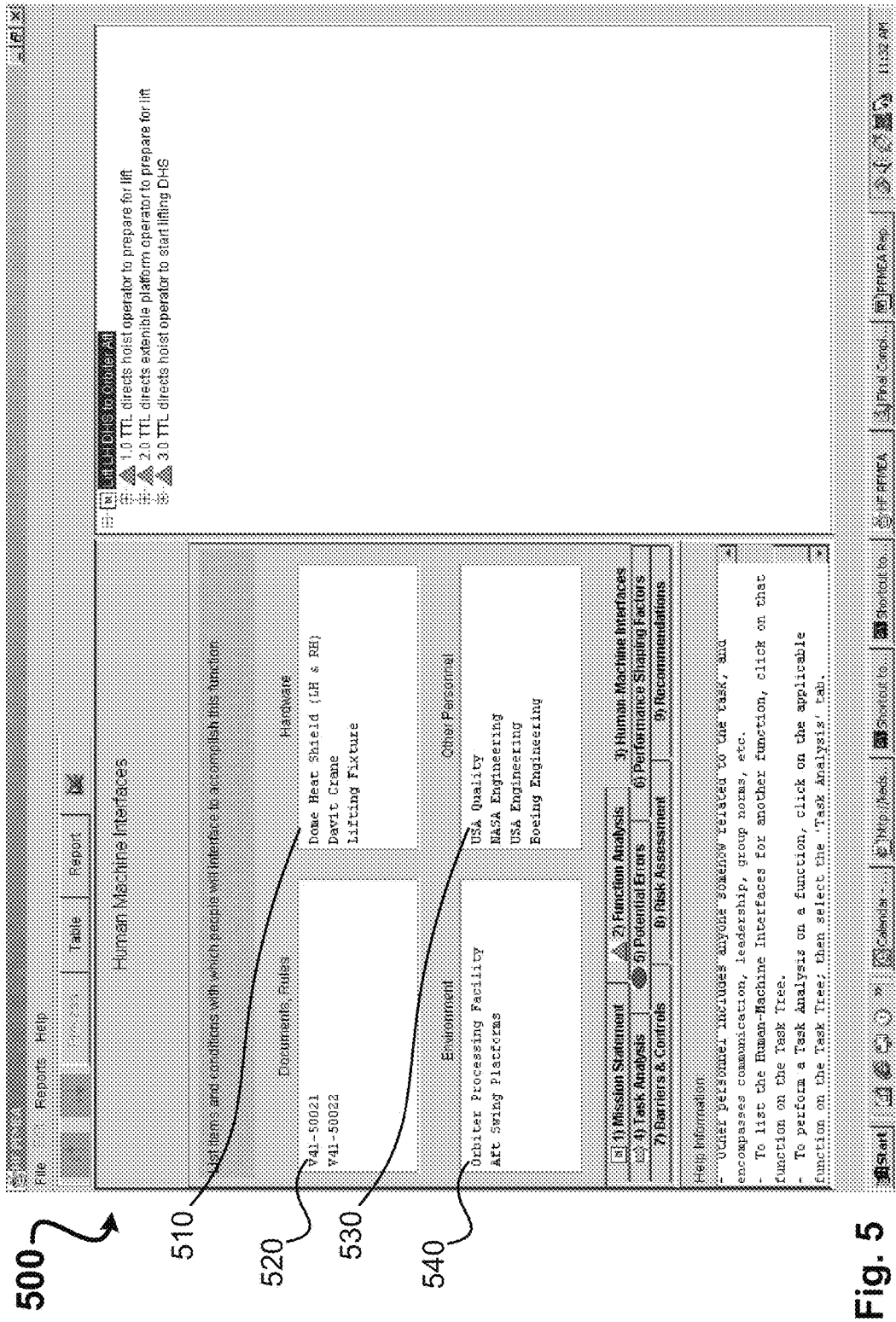

FIG. 5 is an exemplary human-system interface entry screen 500. The human-system interface entry screen 500 provides a number of fields in which information related to the human-system interfaces is entered. A hardware field 510 allows a user to identify hardware, including tools, machines, materials, and other hardware, involved in the process to be identified. A documents field 520 allows a user to identify instruction guides, manuals, policy guides, regulation manuals, and other documents that the human must uses to perform the process. An other personnel field 530 allows a user to identify other persons related to the process, including leaders, groups, and other persons that may influence the actions of the human engaging in the process. An environment field 540 allows a user to identify physical, economic, political, and other factors that potentially will influence the human actor and serve as performance shaping factors or sources of potential error. Using these fields 510, 520, 530, and 540, a user can completely identify all aspects of a human-system interface to facilitate the human error identification and analysis in the HF PFMEA.

Referring back to FIG. 2, at a block 256 a task analysis is performed. The task analysis is a detailed breakdown of the activities involved in completing each of the functions identified at the block 252. The task analysis is a generally hierarchical process in which tasks to complete each function are identified and associated with each function. In one presently preferred embodiment, the tasks are associated with each of the previously-entered function identifiers and labeled appropriately. For example, a first task in a first function may be designated as task "1.1" or "A.1." In a preferred embodiment, all tasks involved in the process should be included in the task analysis 256 to provide a foundation for a complete assessment of the process.

Persons ordinarily skilled in the art of HF PFMEA will appreciate that a function may include a single task and/or a single task may include a number of subtasks. Each task may suitably represent an entirety of a function, represent an element of a function, or both represent an element of a function or task and have its own subtasks. Each task entered will be a child of one of the 0-level functions, even if the task represents the entirety of the function, or may, in turn, have subtasks as its own child tasks.

In one presently preferred embodiment of the present invention, each lowest-level task is entered using a verb. As will be further described, further steps in the HF PFMEA are based on the verb entered.

Figure 6:
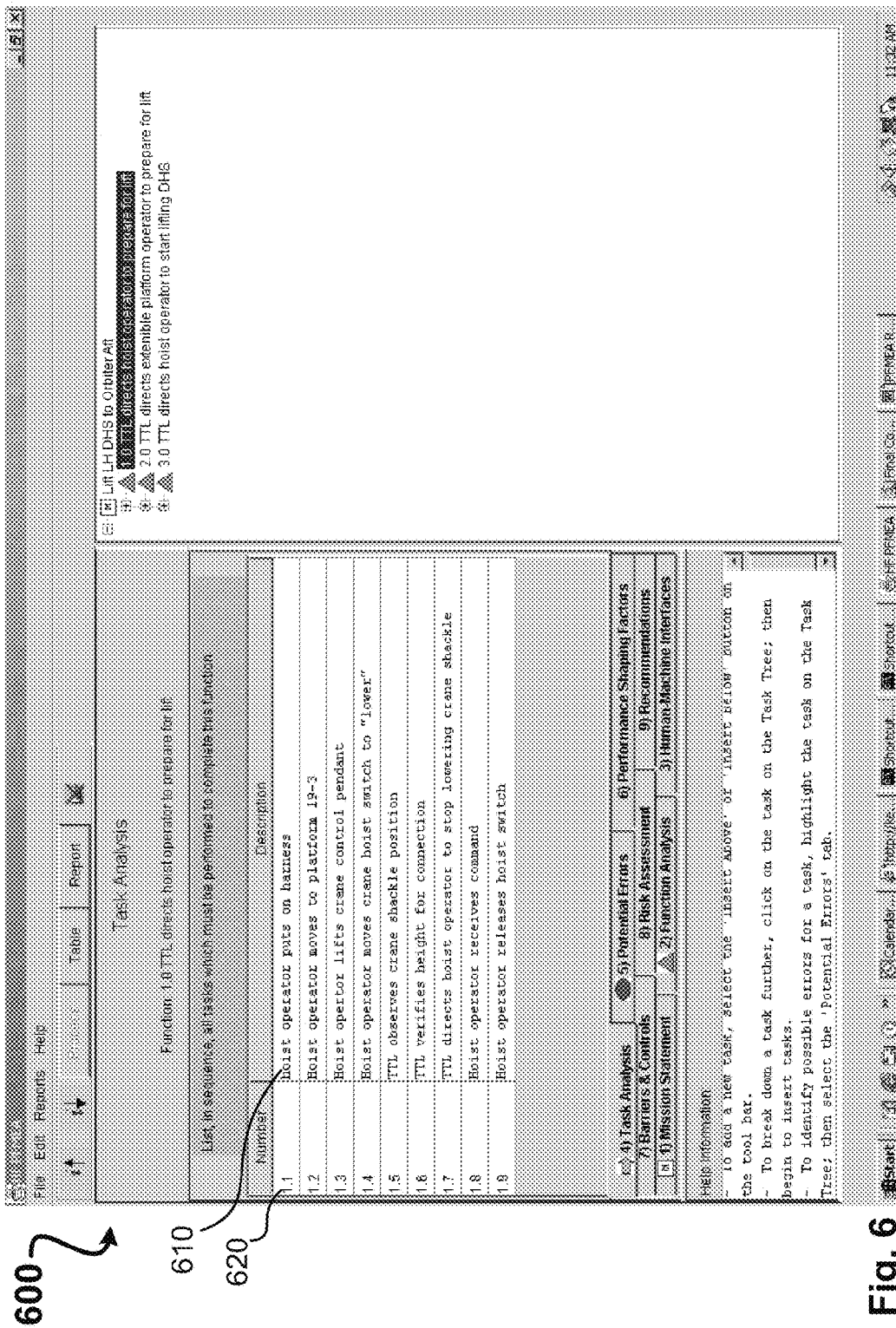

FIG. 6 is an exemplary task analysis entry screen 600. The task analysis entry screen 600 provides a task description column 610 in which the tasks are entered. The task analysis entry screen 600 also provides a task identifier column 620 in which the task descriptions are entered.

Referring back to FIG. 2, at a block 258 a potential human error identification is performed for each individual task. Independent analysis of each task allows for effect of changes applied to each task to be measured. As previously described, descriptions of tasks include a verb. In one presently preferred embodiment of the invention, for each verb, there are a list of potential human errors including both errors of omission and errors of commission. For example, if the verb describing a human activity is "insert," potential errors including "insert in the wrong location," "insert in the wrong order," "insert in the wrong orientation," "fail to insert," or other potential errors. The potential error list includes errors that are skill based, rule based and knowledge based. The potential error list includes errors that occur during all phases of human activity including, but not limited to, perception, cognition, decision making and action execution. Subsequent program data is generated based on that action verb.

In one presently preferred embodiment, the tool 200 recognizes verbs from a database generated from a variety of behavioral taxonomies. When the tool 200 recognizes the verb, it associates it with the task potential human errors that can occur while performing the action, and the factors that can affect that error such as performance shaping factors, barriers that prevent the error, controls that mitigate the effects of the error and mechanisms that allow detection and correction of the error prior to a negative effect. The potential human errors are indexed to the task and function identifiers. The user may also input additional errors that can be incorporated into the database for future use, and incorporated into the current analysis. Once the potential human errors are identified, they are presented to the user in a list.

Figure 7:
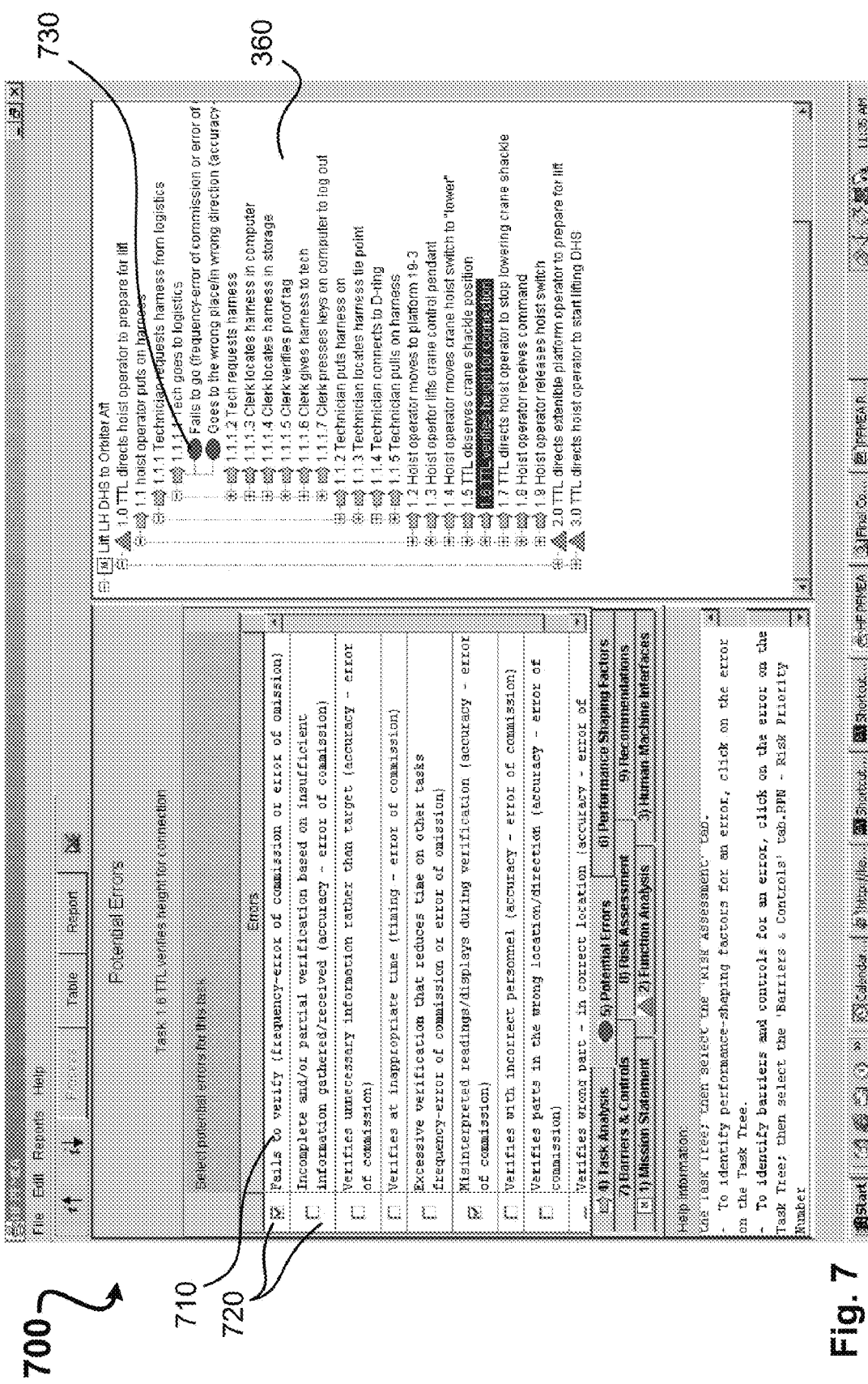

FIG. 7 is an exemplary potential human error entry screen 700. The potential human error entry screen 700 generates a list of potential human errors 710 for the verb used to describe the task. In one presently preferred embodiment, each of the elements in the potential human error list 710 is presented in a check-box format with each of the potential human errors prefaced by a check-box 720. The check-box format allows the user to select the human errors that have the potential to occur during the task. The check-boxes 720, actuated by keys or a pointing device associated with the workstation 110 (FIG. 1) allows a user to easily select relevant errors. When an error is selected, a potential human error entry 730 is added in the hierarchy window 360 and coded uniquely so that it can be identified as an error, rather than a task or function. This hierarchy allows easy scanning of the functions, tasks, and related errors in the process.

Referring back to FIG. 2, at a block 260 a preliminary or cursory screening risk assessment is performed. The preliminary risk assessment is a process for calculating the risk associated with each potential human error. In one presently preferred embodiment, pull-down menus or a similar facility are used to rank potential severity of an effect of each error if each error were to take place, a likelihood that the error will take place, and a probability that the error will be detected and corrected prior to causing an undesired effect. In one embodiment, the potential severity is ranked according to a worst-case effect of each error, a likelihood that the worst case error will take place, and a probability that the error will be detected and corrected prior to the worst-case effect resulting. The tool 200 then automatically calculates a risk priority number (RPN). The RPN is compared to the risk threshold identified at the block 250 (FIG. 2) as part of the mission identification and entered on the mission identification screen 300 (FIG. 3) in the risk threshold field 320. If the RPN is below the risk threshold value, the potential human error is excluded from further analysis as a result of the preliminary risk assessment. If the RPN exceeds the threshold, the potential human error is further evaluated.

Figure 8:
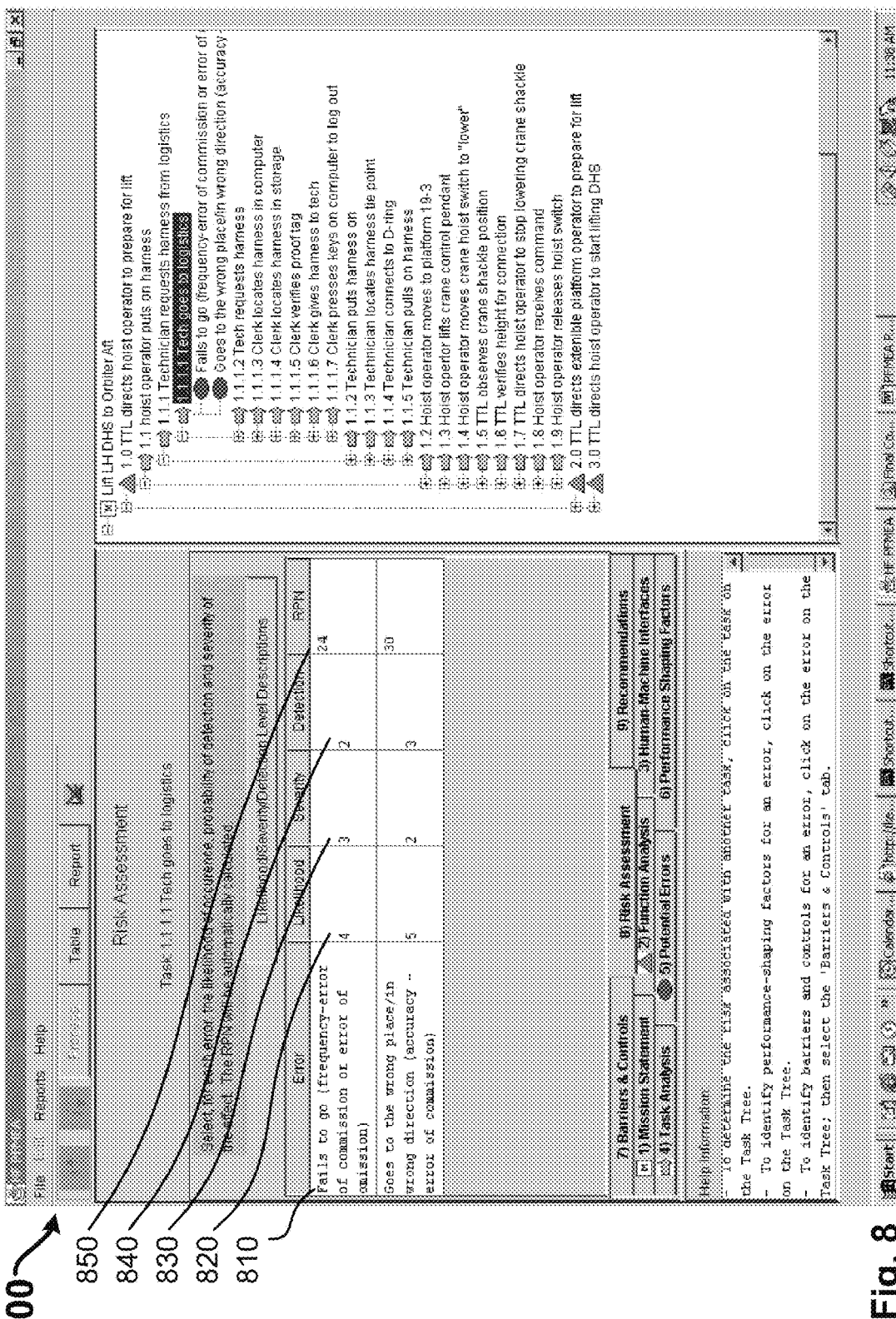

FIG. 8 is an exemplary preliminary risk assessment screen 800. The risk assessment screen 800 prompts the user through an analytical sequence to assess risks associated with each of the previously-identified potential human errors listed in the potential human error column 810. As part of the analytical sequence, for each of the potential human errors listed in the potential human error column 810, the user is asked to numerically value the risk. In a likelihood of occurrence column 820, the user is asked to rate a likelihood of occurrence of the potential human error. In a severity column 830, the user is asked to rate the potential severity of the potential harm. In a likelihood of detection column 840, the user is asked to rate the probability of detection and recovery from the error/correction of the error prior to the worst-case effect occurs. The numbers used to rank the likelihood of the occurrence of the potential human error, the probability of detection of the potential human error and/or potential harm, and the potential severity of the potential harm can be keyed in by a user or selected from a pull-down menu, a radio button, or similar data entry window. In a RPN column 850, the RPN is automatically calculated by the software tool 200 (FIG. 1) as displayed.

In a variation of this embodiment, the risk assessment screen 800 would also include a column for likelihood of worst-case effect and column for a risk assessment code. The information collected earlier in the analysis, such as data on the performance shaping factors and barriers and, in some cases, human error probabilities would be used to calculate the likelihood of the potential error. The likelihood of the worst-case effect includes a combination of the likelihood of the potential error, controls that mitigate the effects of the errors, and methods to detect and correct the errors and/or prevent the worst-case effects. The risk assessment code is the product of the likelihood of the worst-case effect and the potential severity of the worst-case effect. The risk assessment code would provides a risk assessment for the potential human error. If the risk assessment code exceeds the threshold, a recommendation is generated to eliminate the error, reduce the number of errors, eliminate the negative effect of the error, mitigate the negative effect of the error or provide a method to detect and recover from the negative effect, prior to its occurrence.

Referring back to FIG. 2, at a block 262 a performance-shaping factor identification is performed. The performance-shaping risk assessment identifies a list of possible performance-shaping factors (PSFs) for each error. PSFs are factors that can affect the performance of the human performing the task that would tend to make the human more or less likely to make each error. Similar to the manner in which the list of potential human errors is generated as a result of the verb used to describe the task, the performance-shaping factor identification generates a list of PSFs related to each of the potential human errors. Distinct lists of PSFs are presented for perception errors, cognition errors, decision making errors, action execution errors, and other forms of errors. In one presently preferred embodiment, from a list of potential PSFs generated, the user selects the factors that are likely to affect the worker for the task in question by clicking on checkboxes. As with the errors identification, the software tool 200 (FIG. 1) allows the user to manually enter additional PSFs if the list of potential PSFs does not include PSFs recognized by the user. In one embodiment of this invention, the PSFs are useable as multipliers during the risk assessment to increase or decrease the likelihood of the worst-case effect.

At a block 264 a barriers and controls identification is performed. The barriers identification identifies a list of items that will either prevent the potential human error from happening. For example, a barrier to a human error includes placing a guard over an activation switch, or adding a safety switch that must be separately actuated to allow operation of the activation switch. The control identification identifies a list of items or processes that reduce the number of errors that can occur or the negative impact of the errors. For example, a control includes a quality test to inspect a system and/or a corrective action inspection to The list of potential barriers and controls is developed for each potential human error.

At a block 266 an identification of opportunities for detection/correction of human errors is performed. Once the performance-shaping factor 262 and the barriers and controls identification 264 have been performed, other steps to detect potential human errors and correct them can be made. These measures can then be incorporated into the process to reduce the likelihood of potential human errors.

At a block 268, in one presently preferred embodiment of the present invention, a worst-case effect assessment is performed. Considering the identification of performance-shaping factors, barriers and controls, and opportunities for detection correction, now a worst case assessment of remaining potential human errors can be considered. The qualification of the worst case error can be included in the risk calculation. At a block 270, a detailed risk assessment is performed. The detailed risk assessment 270 allows for analysis of potential human errors now that potential human errors eliminated in the preliminary risk assessment 260 are disregarded and the impact of measures considered at blocks 262, 264, and 266 have been assessed. At the block 270, the impact of each remaining potential error can be fully assessed in light of the worst-case effect identified at the block 268, therefore, it can be determined if the risk of the potential human error is acceptable or whether the tasks, functions, and/or process should be redesigned or aborted.

At a block 272, the user is asked to generate recommendations. Recommendations can be made during the generation of the original analysis or they can be made later after reviewing the table 140 and text report 150 (FIG. 1) as will be further discussed below. In the recommendation generation process, the user is presented with the PSFs and related barriers and controls to assist the user in developing recommendations that might improve the results of the analysis. As previously described, the navigation buttons 340 (FIG. 3) allow the user to move to other portions of the analysis, such as to revisit the PSFs and/or barriers and controls sections and look at the items that were not selected as part of generating recommendations. The user also can add additional recommendations not already manifested in existing barriers and controls.

Figure 9:
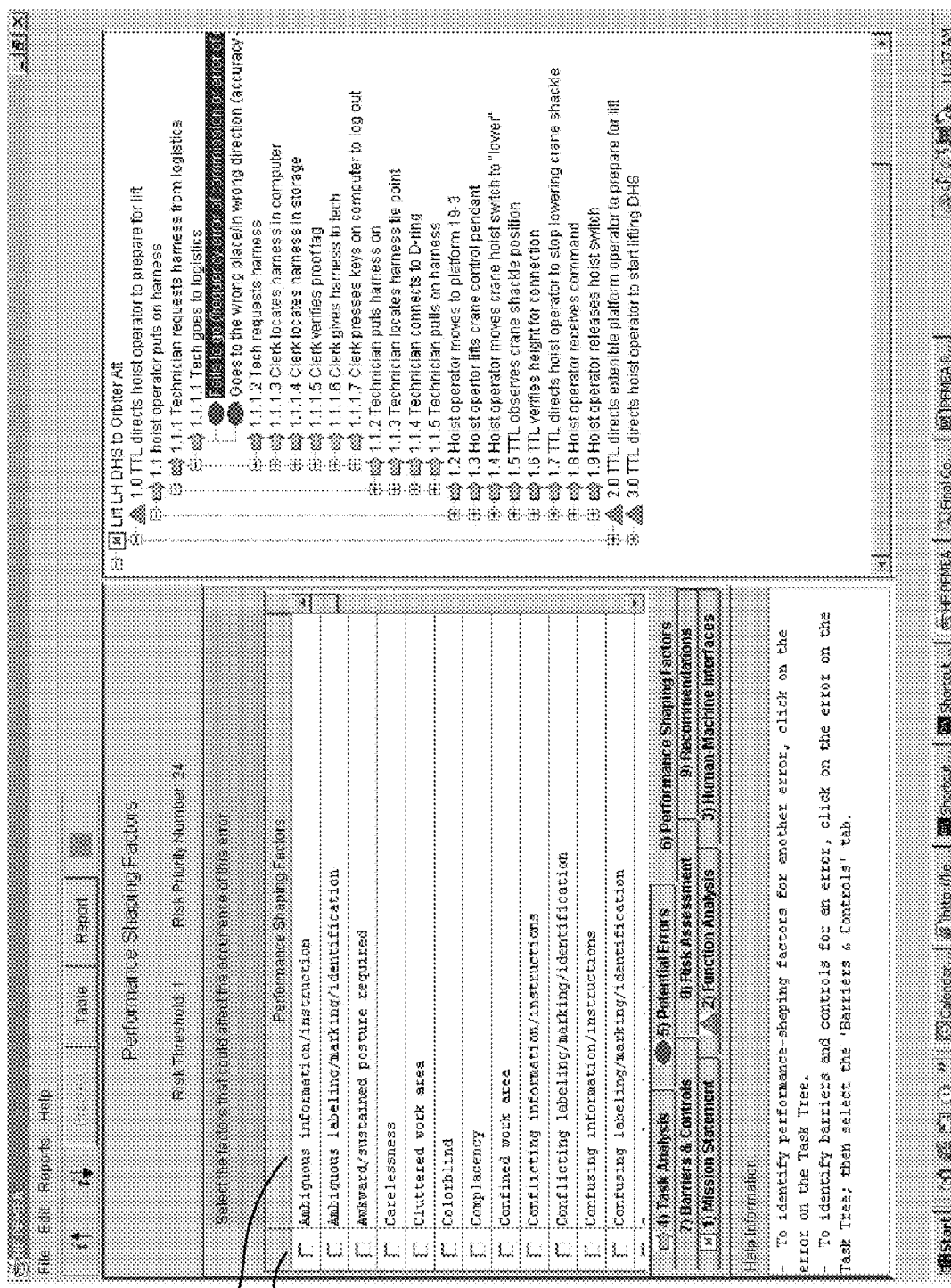
Figure 10:
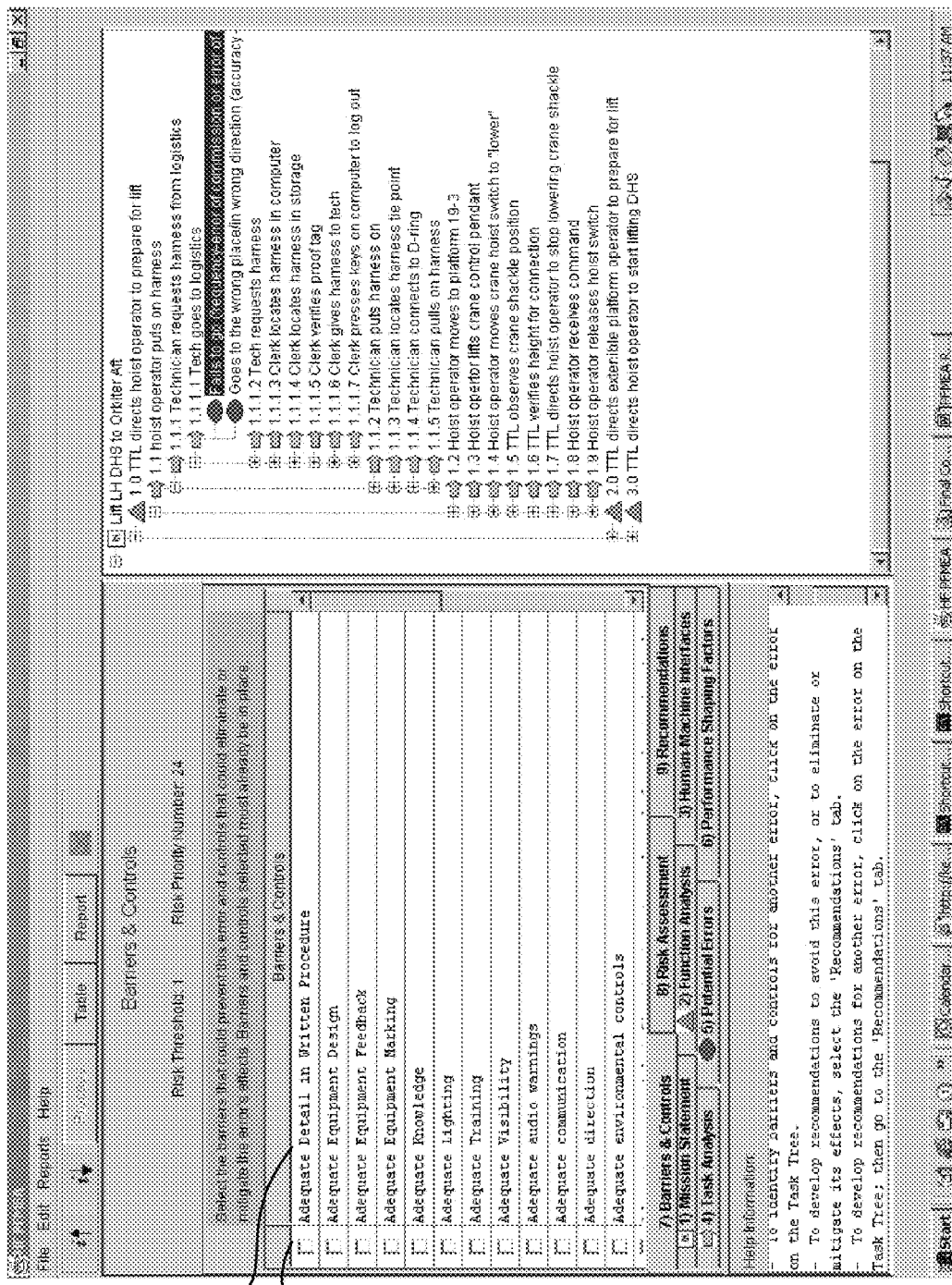
Figure 11:
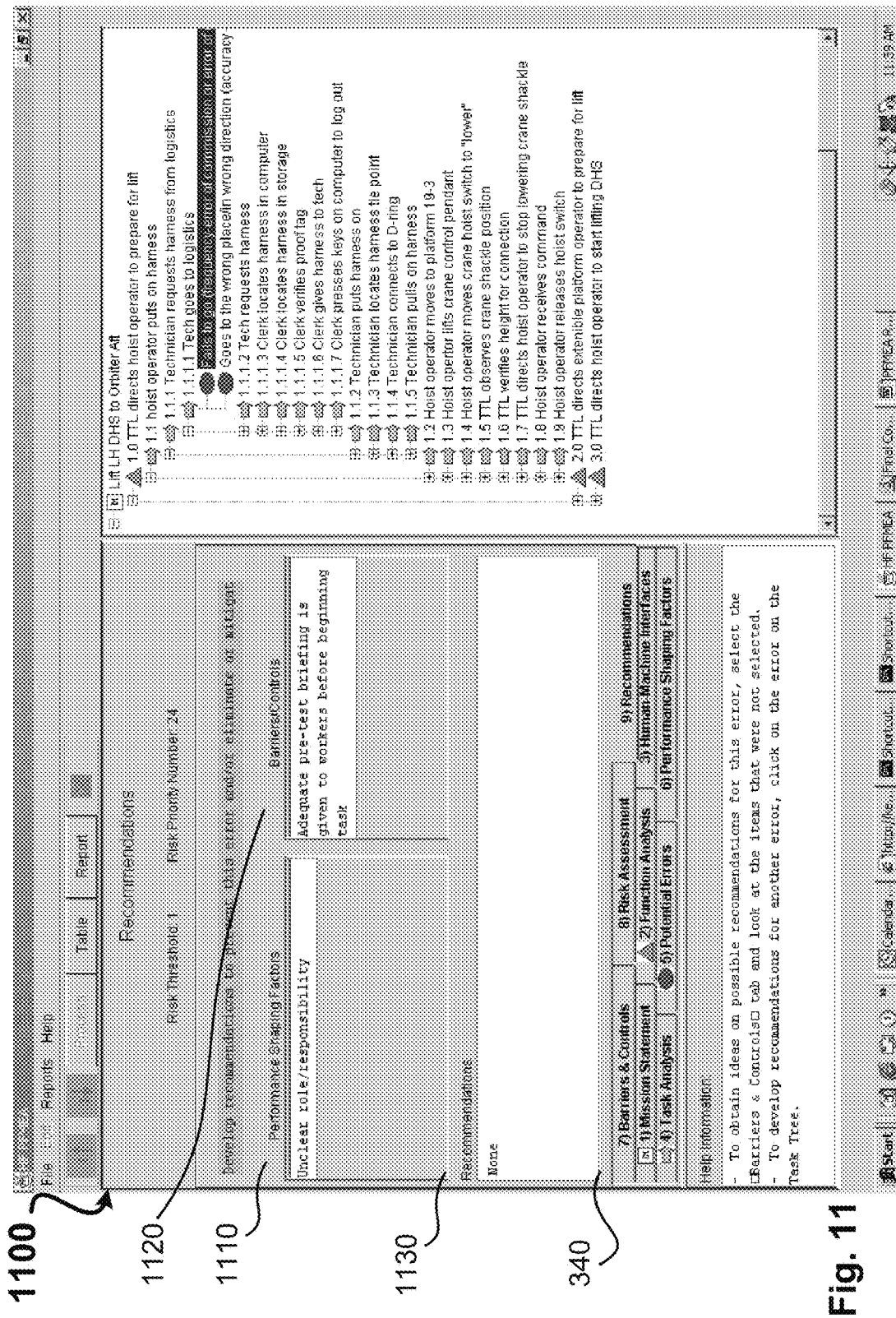

FIG. 9 is an exemplary recommendations generation screen 900. The recommendation generation screen 900 a list of relevant PSFs in a PSF field 910 and related barriers and controls in a barrier and control field 920. As previously described, the user can use the navigation buttons 340 to shift to other phases of the analysis to reconsider PSFs and barriers and controls. In addition, the recommendations generation screen 900 presents a recommendation entry field 930 where the user can enter new recommendations to improve the process and reduce the likelihood or potential severity of the effect resulting from human errors, or make such errors more readily detectable.

At a decision block 274, it is determined if evaluation of additional errors is desired. If other potential human errors remain after the preliminary risk assessment at the block 260 for which correction is desired, the routine 205 loops to the block 260 to undertake a preliminary risk assessment for each additional error. Once it is determined at the decision block 274 that there are no additional errors for which further evaluation is appropriate, the routine proceeds to a decision block 276.

At the decision block 276, it is determined if evaluation of additional tasks in the process is desired. If so, the routine 205 loops to the block 258 for potential error identification for the next additional task, then each potential human error is identified as previously described. If it is determined at the decision block 278 that evaluation of additional tasks is not desired, the routine proceeds to the decision block 215.

At the decision block 215 it is determined if a review of the data and results of the analysis component is desired. As previously described, the user can move back and forth between the phases of the analysis to adjust phases of the analysis throughout the process. Embodiments of the present invention are not limited to a process where the user must proceed linearly and unidirectionally through the process. Still, upon completing phases of the analysis and reaching the decision block 215, the user can employ a task tree component 220 to review the phases of the analysis component 210. Using the task tree component 220, the user will select from among the elements within the analysis component. In one presently preferred embodiment, the task tree component 220 operates similarly to a typical Internet browser, allowing the user to browse the data previously entered. The task tree component 220 becomes more and more useful as the analysis proceeds due to the potentially large amounts of data through which the user will have to navigate. The task tree component 220 has the capability to edit any of the fields, navigating to those fields by using a navigation tools provided by the task tree 220.

At a block 230, a final table 140 and text report 150 (FIG. 1) are generated. Again, the user can review drafts of the table and text report throughout the analysis component 210 and as part of the task tree component 220 in performing and revising the analysis. Once the analysis component 210 and the task tree component 220 are complete, however, the report generation component 230 generates what is, at least, a complete draft of the table 140 and text report 150.

While preferred embodiments of the invention have been illustrated and described, many changes can be made to these embodiments without departing from the spirit and scope of the invention. Accordingly, the scope of the invention is not limited by the disclosure of the preferred embodiment. Instead, the invention should be determined entirely by reference to the claims that follow.

What is claimed is:

1. A method for performing human factors process failure modes and effects analysis for a process, the method comprising:
   receiving, at a data processing device, inputs representing at least one task involved in the process, the task including at least one human activity and described using at least one verb and at least one human-system interface;
   extracting, with the data processing device, the at least one verb from the received inputs representing the at least one task involved in the process;
   searching, with the data processing device, a potential human error database for at least two potential human errors related the extracted at least one verb;
   transmitting, with the data processing device, an output representing the at least two potential human errors in the search;
   receiving, at the data processing device, an input representing which of the at least two potential human errors were selected for evaluation;
   transmitting, from the data processing device, an output representing at least one of the potential human errors selected for evaluation;
   receiving, at the data processing device, an input representing a likelihood of occurrence of the at least one of the potential human errors selected for evaluation;
   receiving, at the data processing device, an input representing a likelihood of correction of the at least one of the potential human errors selected for evaluation;
   receiving, at the data processing device, an input representing a potential severity of an effect of of the at least one of the potential human errors selected for evaluation;
   calculating, with the data processing device, a risk of potential harm from the received inputs representing the likelihood of occurrence, the likelihood of correction, and the potential severity of the effect;
   comparing, at the data processing device, the calculated risk of potential harm with a risk threshold;
   transmitting, from the data processing device, an output representing at least one error that exceeds the risk threshold;
   receiving, at the data processing unit, an input representing additional analysis of the at least one error that exceeds the risk threshold; and
   generating, with the data processing device, at least one of a report and a table collecting results of the human factors process failure modes and effects analysis.

2. The method of claim 1, wherein a plurality of human errors associated with the verb used in describing the human activity is presented in an error list.

3. The method of claim 1, further comprising performing, with the data processing device, a screening of potential human errors by calculating a risk priority number, below which the potential human error will not be further analyzed.

4. The method of claim 1, wherein calculating the risk of potential harm further comprises quantifying the likelihood of occurrence, quantifying the likelihood of correction, quantifying the likelihood of occurrence of the effect, and quantifying the potential severity of the effect.

5. The method of claim 1, wherein the likelihood of occurrence of the potential human error human error includes a likelihood of occurrence of a worst-case effect of the human error such that the risk of potential harm includes a risk of the worst-case effect of human error.

6. The method of claim 5, further comprising receiving, at the data processing device, an input representing mechanisms that allow at least one of detection, correction, and prevention of the potential human error to prevent the worst-case effect from occurring.

7. The method of claim 1, further comprising receiving, at the data processing device, an input representing a performance-shaping factor for the human error that changes the likelihood that the human error will occur, the performance-shaping factor being related to the human activity involved in the task.

8. The method of claim 7, wherein a plurality of performance-shaping factors is output by the data processing device in a performance-shaping factor list from which a user can select at least one performance-shaping factor that changes the likelihood that the potential human error will occur.

9. The method of claim 1, further comprising receiving, at the data processing device, an input representing at least one barrier directed to preventing the occurrence of the human error.

10. The method of claim 9, further comprising recalculating the risk of potential harm to include an effect of the barrier in preventing the occurrence of the human error.

11. The method of claim 1, further comprising receiving, at the data processing device, an input representing at least one control directed to mitigating the effect of the human error.

12. The method of claim 11, further comprising recalculating the risk of potential harm to include an effect of the control in mitigating the potential harm produced by the human error.

13. The method of claim 11, further comprising recalculating the risk of potential harm to include human error probability data.

14. The method of claim 1, further comprising receiving, at the data processing device, an input representing a recommendation that one of prevents the human error, mitigates the effect of the human error, allows detection of the human error, and allows correction of the human error prior to the occurrence of the human error.

15. The method of claim 14, further comprising determining which of a plurality of potential human errors should have a recommendation to change the risk and which of the plurality of potential human errors requires no further action.

16. A computer-readable medium having stored thereon logic instructions which, when executed by a processor, configure the processor to perform human factors process failure modes and effects analysis for a process, by performing operations, comprising:
   receiving, at a data processing device, inputs representing at least one task involved in the process, the task including at least one human activity and described using at least one verb and at least one human-system interface;
   extracting, with the data processing device, the at least one verb from the received inputs representing the at least one task involved in the process;
   searching, with the data processing device, a potential human error database for at least two potential human errors related the extracted at least one verb;
   transmitting, with the data processing device, an output representing the at least two potential human errors in the search;

receiving, at the data processing device, an input representing which of the at least two potential human errors were selected for evaluation;

transmitting, from the data processing device, an output representing at least one of the potential human errors selected for evaluation;

receiving, at the data processing device, an input representing a likelihood of occurrence of the at least one of the potential human errors selected for evaluation;

receiving, at the data processing device, an input representing a likelihood of correction of the at least one of the potential human errors selected for evaluation;

receiving, at the data processing device, an input representing a potential severity of an effect of the at least one of the potential human errors selected for evaluation;

calculating, with the data processing device, a risk of potential harm from the received inputs representing the likelihood of occurrence, the likelihood of correction, and the potential severity of the effect;

comparing, at the data processing device, the calculated risk of potential harm with a risk threshold;

transmitting, from the data processing device, an output representing at least one error that exceeds the risk threshold;

receiving, at the data processing unit, an input representing additional analysis of the at least one error that exceeds the risk threshold; and generating, with the data processing device, at least one of a report and a table collecting results of the human factors process failure modes and effects analysis.

17. The computer readable medium of claim 16, wherein a plurality of human errors associated with the verb used in describing the human activity is presented in an error list.

18. The computer readable medium of claim 16, further comprising performing, with the data processing device, a screening of potential human errors by calculating a risk priority number, below which the potential human error will not be further analyzed.

19. The computer readable medium of claim 16, wherein calculating the risk of potential harm further comprises quantifying the likelihood of occurrence, quantifying the likelihood of correction, quantifying the likelihood of occurrence of the effect, and quantifying the potential severity of the effect.

20. The computer readable medium of claim 16, wherein the likelihood of occurrence of the potential human error human error includes a likelihood of occurrence of a worst-case effect of the human error such that the risk of potential harm includes a risk of the worst-case effect of human error.

21. The computer readable medium of claim 20, wherein the operations further comprise receiving, at the data processing device, an input representing mechanisms that allow at least one of detection, correction, and prevention of the potential human error to prevent the worst-case effect from occurring.

22. The computer readable medium of claim 16, wherein the operations further comprise receiving, at the data processing device, an input representing a performance-shaping factor for the human error that changes the likelihood that the human error will occur, the performance-shaping factor being related to the human activity involved in the task.

23. The computer readable medium of claim 22, wherein a plurality of performance-shaping factors is output by the data processing device in a performance-shaping factor list from which a user can select at least one performance-shaping factor that changes the likelihood that the potential human error will occur.

24. The computer readable medium of claim 16, wherein the operations further comprise receiving, at the data processing device, an input representing at least one barrier directed to preventing the occurrence of the human error.

25. The computer readable medium of claim 24, wherein the operations further comprise recalculating the risk of potential harm to include an effect of the barrier in preventing the occurrence of the human error.

26. The computer readable medium of claim 16, wherein the operations further comprise receiving, at the data processing device, an input representing at least one control directed to mitigating the effect of the human error.

27. The computer readable medium of claim 26, wherein the operations further comprise recalculating the risk of potential harm to include an effect of the control in mitigating the potential harm produced by the human error.

28. The computer readable medium of claim 26, wherein the operations further comprise recalculating the risk of potential harm to include human error probability data.

29. The computer readable medium of claim 16, wherein the operations further comprise receiving, at the data processing device, an input representing a recommendation that one of prevents the human error, mitigates the effect of the human error, allows detection of the human error, and allows correction of the human error prior to the occurrence of the human error.

30. The computer readable medium of claim 29, wherein the operations further comprise determining which of a plurality of potential human errors should have a recommendation to change the risk and which of the plurality of potential human errors requires no further action.

31. A computer-based system to performing human factors process failure modes and effects analysis for a process, the system comprising:
   a processor;
   a memory module coupled to the processor and comprising logic instructions which, when executed by a processor, configure the processor to perform human factors process failure modes and effects analysis for a process, by performing operations, comprising:
      receiving, at a data processing device, inputs representing at least one task involved in the process, the task including at least one human activity and described using at least one verb and at least one human-system interface;
      extracting, with the data processing device, the at least one verb from the received inputs representing the at least one task involved in the process;
      searching, with the data processing device, a potential human error database for at least two potential human errors related the extracted at least one verb;
      transmitting, with the data processing device, an output representing the at least two potential human errors in the search;
      receiving, at the data processing device, an input representing which of the at least two potential human errors were selected for evaluation;
      transmitting, from the data processing device, an output representing at least one of the potential human errors selected for evaluation;
      receiving, at the data processing device, an input representing a likelihood of occurrence of the at least one of the potential human errors selected for evaluation;
      receiving, at the data processing device, an input representing a likelihood of correction of the at least one of the potential human errors selected for evaluation;

receiving, at the data processing device, an input representing a potential severity of an effect of the at least one of the potential human errors selected for evaluation;

calculating, with the data processing device, a risk of potential harm from the received inputs representing the likelihood of occurrence, the likelihood of correction, and the potential severity of the effect;

comparing, at the data processing device, the calculated risk of potential harm with a risk threshold;

transmitting, from the data processing device, an output representing at least one error that exceeds the risk threshold;

receiving, at the data processing unit, an input representing additional analysis of the at least one error that exceeds the risk threshold; and generating, with the data processing device, at least one of a report and a table collecting results of the human factors process failure modes and effects analysis.

32. The computer-based system of claim 31, wherein a plurality of human errors associated with the verb used in describing the human activity is presented in an error list.

33. The computer-based system of claim 31, further comprising performing, with the data processing device, a screening of potential human errors by calculating a risk priority number, below which the potential human error will not be further analyzed.

34. The computer-based system of claim 31, wherein calculating the risk of potential harm further comprises quantifying the likelihood of occurrence, quantifying the likelihood of correction, quantifying the likelihood of occurrence of the effect, and quantifying the potential severity of the effect.

35. The computer-based system of claim 31, wherein the likelihood of occurrence of the potential human error human error includes a likelihood of occurrence of a worst-case effect of the human error such that the risk of potential harm includes a risk of the worst-case effect of human error.

36. The computer-based system of claim 31, wherein the operations further comprise receiving, at the data processing device, an input representing mechanisms that allow at least one of detection, correction, and prevention of the potential human error to prevent the worst-case effect from occurring.

37. The computer-based system of claim 31, wherein the operations further comprise receiving, at the data processing device, an input representing a performance-shaping factor for the human error that changes the likelihood that the human error will occur, the performance-shaping factor being related to the human activity involved in the task.

38. The computer-based system of claim 37, wherein a plurality of performance-shaping factors is output by the data processing device in a performance-shaping factor list from which a user can select at least one performance-shaping factor that changes the likelihood that the potential human error will occur.

39. The computer-based system of claim 31, wherein the operations further comprise receiving, at the data processing device, an input representing at least one barrier directed to preventing the occurrence of the human error.

40. The computer-based system of claim 39, wherein the operations further comprise recalculating the risk of potential harm to include an effect of the barrier in preventing the occurrence of the human error.

41. The computer-based system of claim 31, wherein the operations further comprise receiving, at the data processing device, an input representing at least one control directed to mitigating the effect of the human error.

42. The computer-based system of claim 31, wherein the operations further comprise recalculating the risk of potential harm to include an effect of the control in mitigating the potential harm produced by the human error.

43. The computer-based system of claim 31, wherein the operations further comprise recalculating the risk of potential harm to include human error probability data.

44. The computer-based system of claim 31, wherein the operations further comprise receiving, at the data processing device, an input representing a recommendation that one of prevents the human error, mitigates the effect of the human error, allows detection of the human error, and allows correction of the human error prior to the occurrence of the human error.

45. The computer-based system of claim 31, wherein the operations further comprise determining which of a plurality of potential human errors should have a recommendation to change the risk and which of the plurality of potential human errors requires no further action.

* * * * *